Figure 1:
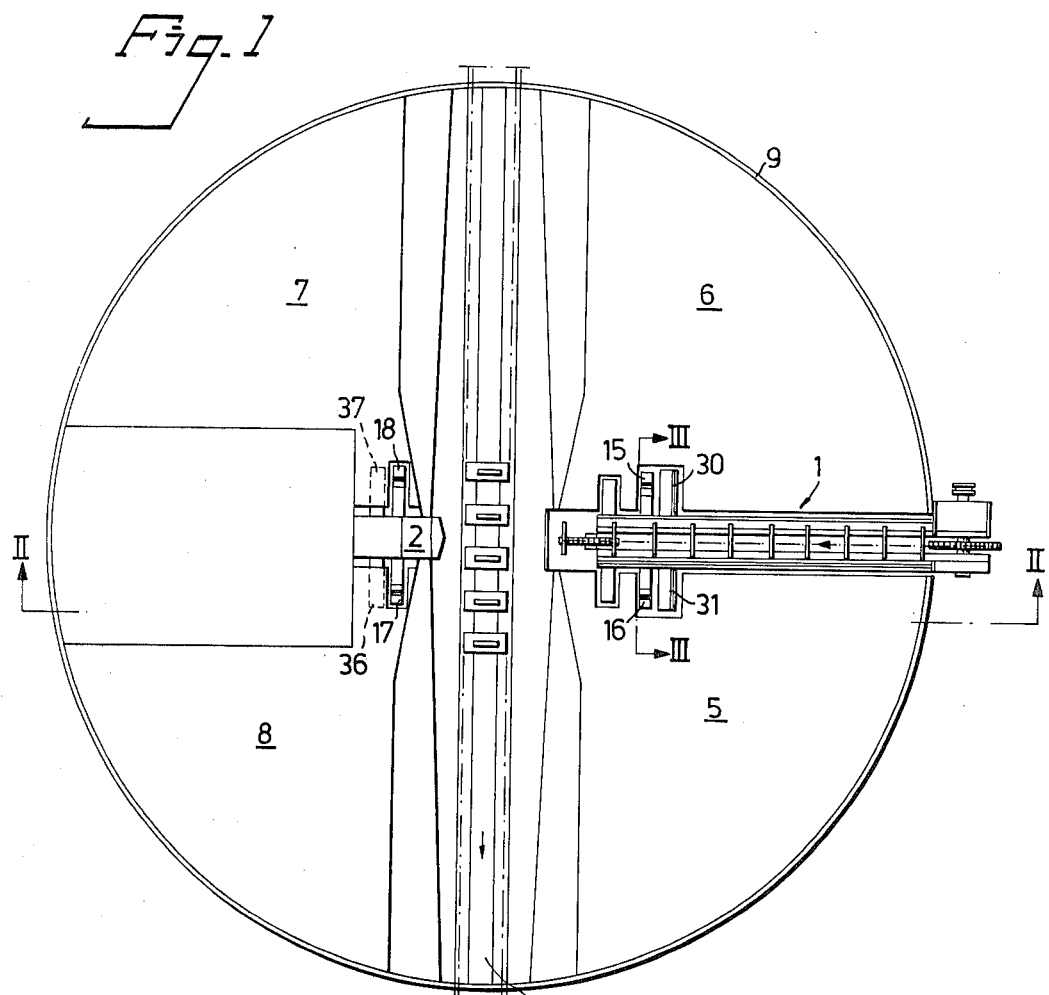

United States Patent [19]

Ekholm et al.

[11] 4,078,651
[45] Mar. 14, 1978

[54] LOG TURNER FOR ALIGNING LOGS

[75] Inventors: Rolf Ekholm; Lars-Börje Åsén, both of Nyland, Sweden

[73] Assignee: AB Hammars Mekaniska Verkstad, Nyland, Sweden

[21] Appl. No.: 701,401

[22] Filed: Jun. 30, 1976

[30] Foreign Application Priority Data

Jul. 7, 1975 Sweden .............................. 7507776

[51] Int. Cl.² .......................................... B65G 47/24
[52] U.S. Cl. ................................. 198/400; 198/411; 214/1 P
[58] Field of Search .............. 198/395, 400, 410, 411, 198/412, 413, 416, 489, 598, 637; 214/1 P

[56] References Cited

U.S. PATENT DOCUMENTS

| 602,375 | 4/1898 | Suydam | 198/473 |
|---|---|---|---|
| 3,289,808 | 12/1966 | Simmons | 198/395 |
| 3,389,777 | 6/1968 | Rysti | 198/399 |
| 3,960,267 | 6/1976 | Valo | 198/410 |
| 3,961,698 | 6/1976 | Ahlenius et al. | 198/412 |

FOREIGN PATENT DOCUMENTS

| 970,401 | 7/1975 | Canada | 214/1 P |
|---|---|---|---|
| 42,293 | 3/1970 | Finland | 214/1 P |
| 210,890 | 7/1966 | Sweden | 214/1 P |
| 218,534 | 5/1967 | Sweden. | |
| 198,364 | 12/1964 | Sweden | 214/1 P |

Primary Examiner—Evon C. Blunk
Assistant Examiner—Richard K. Thomson
Attorney, Agent, or Firm—Silverman & Cass, Ltd.

[57] ABSTRACT

An improved log turner including a charge conveyor for feeding logs across an opening onto a carrying chute aligned with the charge conveyor. A discharge conveyor is located beneath the opening perpendicular to the charge conveyor. One pair of arc-shaped push-off arms is pivotally attached near the opening on opposite sides of the charge conveyor and the carrying chute. One arm of each pair of arms, opposite to one another, is pivoted to push-off and pivot a log resting on the charge conveyor and the carrying chute into the discharge conveyor.

4 Claims, 3 Drawing Figures

LOG TURNER FOR ALIGNING LOGS

This invention relates to a turning device for aligning logs in such a manner that at their delivery to a conveyor all logs during their subsequent transport to a processing place have their top or root end located ahead.

It is previously known to utilize for such aligning work a log turner, which turns all logs through 90°. The log turner comprises two conveyors, which are disposed perpendicularly to each other and on different levels. The upper one of the conveyors includes an opening straight above the lower conveyor, and sloping slide planes extend from both sides of the upper conveyor down to the sides of the lower conveyor, so that the logs dumped from the upper conveyor slide through said opening and on the slide planes down to the lower conveyor. It is known, that for dumping the logs from the upper conveyor the conveyor rollers carrying the logs are supported in cradles on the conveyor, in such a manner, that the cradles on both sides of said opening are pivoted simultaneously in opposed directions for dumping a log on the slide plane, on which it is transported further to the lower conveyor. It is further known to utilize for the dumping operation a means, which is mounted pivotally about a vertical axle above the upper conveyor and comprises four vertical legs, between which a log is charged, whereafter the legs on opposed sides of the log and on each side of the vertical axle engage with the log and dump it from the upper conveyor onto the sloping slide plane and the lower conveyor. The firstmentioned dumping arrangement is of complicated design, particularly with respect to the carrying and pivoting members of the cradles, and the lastmentioned dumping arrangement requires a sturdy design to provide the legs with sufficient strength during the repeated log dumpings, and causes unnecessary energy consumption, because simultaneously with the operative legs also the two non-operative legs must be pivoted.

The present invention has the object of providing for the log aligning work in question a log turner, which is of sturdy reliable design and operates with a high working rate.

This object is achieved by a log turner for aligning logs, which comprises a charge conveyor for positioning a log over an opening, beneath which a discharge conveyor extends perpendicularly to the charge conveyor, and push-off members are attached adjacent the charge conveyor and the opening to push-off logs onto sheet metal decks sloping from the charge conveyor to the discharge conveyor to pass down the pushed-off logs onto said lastmentioned conveyor. The log turner according to the invention is characterized thereby that it comprises in alignment with the charge conveyor and on the side of the opening remote from said conveyor a carrying chute, roller plane or the like for carrying together with the charge conveyor a log advanced over said opening, and push-off members in the form of per se known arc-shaped push-off arms, of which two are attached each on one side of and with its bearing beneath the charge conveyor at the portion thereof which is adjacent said opening, and two push-off arms are attached each on one side of and with its bearing beneath the carrying chute or the like, and the push-off arm attached on one side of the charge conveyor is adapted to co-operate with the push-off arm attached on the opposed side of the carrying chute or the like so as during the commenced pivotal movement to push off a log to the respective sheet metal deck for completing the pivotal movement of the log while it is passed down to the discharge conveyor.

Figure 2:
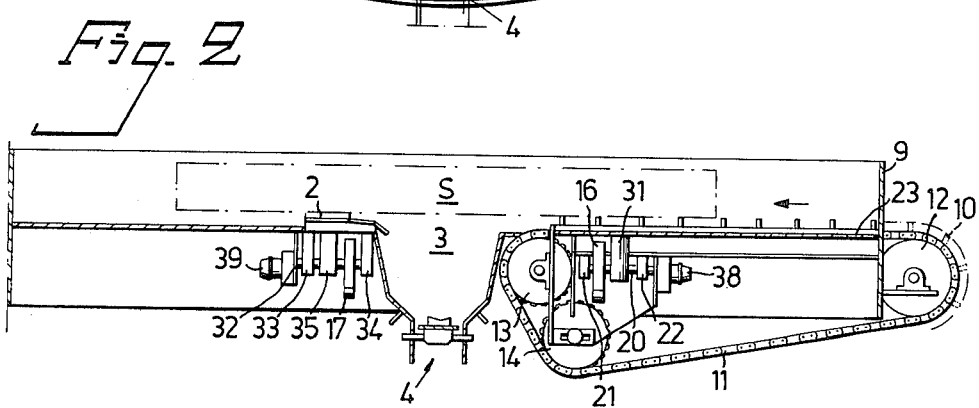
Figure 3:
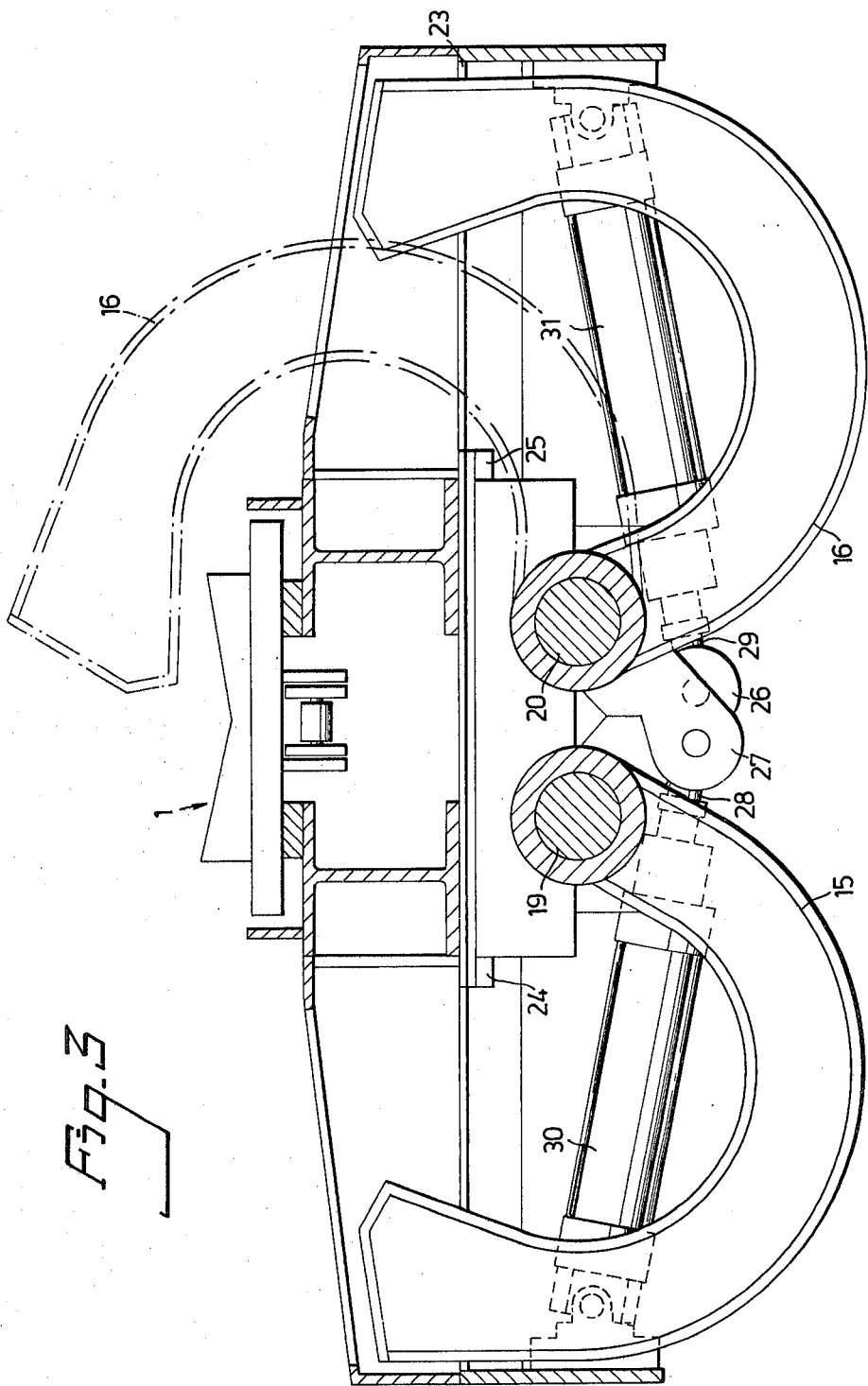

The invention is illustrated by an embodiment thereof shown by way of example in the accompanying drawings, in which FIG. 1 is a horizontal view of the log turner according to the invention, FIG. 2 is a vertical section along the line II—II in FIG. 1, FIG. 3 is a cross-section on an enlarged scale after the line III—III in FIG. 1.

The log turner according to FIG. 1 comprises a charge conveyor 1 and aligning and on the same level therewith but spaced therefrom a carrying chute 2, so that an opening 3 is formed between the carrying chute 2 and the adjacent end of the charge conveyor 1. A discharge conveyor 4 extends beneath the opening 3 on a lower level than the level of the charge conveyor 1 and carrying chute 2 and perpendicularly to their longitudinal direction. Sheet metal decks 5–8 of sector-shape incline downward from each side of the charge conveyor 1 to one side of the discharge conveyor 4 and from each side of the carrying chute 2 to the other side of the discharge conveyor 4. The sheet metal decks 5–8 are enclosed in a cylindric vertical casing 9 with recesses for the charge conveyor 1. Said conveyor, as shown in FIGS. 1 and 2, is provided with an endless chain 11, which is equipped with pushers 10 and laid about carrying sprocket wheels 12, 13, of which the wheel 12 is driven mechanically, and over a tension wheel 14. The upper strand of the chain 11 is driven in the direction toward the opening 3 as indicated by the arrow. The carrying chute 2 is rigidly mounted, and its carrying surface is located on the same level as the pushers 10 on the upper strand of the chain 11 and acts as a slide plane for a log S advanced by the charge conveyor, as indicated by dashed lines.

On each side of the charge conveyor 1, at its portion adjacent the opening 3, a push-off arm 15 and 16, respectively, is provided, and on each side of the carrying chute 2 a push-off arm 17 and 18, respectively, is provided.

FIG. 3 shows that the push-off arms 15, 16 are arc-shaped, and that the push-off arms 17, 18 have the same shape. The push-off arms 15, 16 are attached rigidly each on a horizontal axle 19 and 20, respectively, each being supported rotatably in two bearings, of which the two bearings 21 and 22 of the axle 20 are visible in FIG. 2 and suspended in the frame 23 of the conveyor 1. Said frame is provided for each push-off arm with a stop shoulder, of which the shoulders 24 and 25 are shown.

On each axle 19 and 20 a lever 26 and 27, respectively, is attached, which are located to the side of each other and are connected each to a piston rod 28 and 29, respectively, each in a hydraulic cylinder 30, 31 with one end pivotally mounted on the frame 23. The same construction applies to the push-off arms 17 and 18 beneath the carrying chute 2, as also these arms 17, 18 are fastened each on an axle with a lever connected to the piston rod in a hydraulic cylinder. To the left in FIG. 2 only the push-off arm 17 is shown, which is supported on an axle 32 mounted in bearings 33 and 34 suspended in the frame. To the side of the push-off arm 17 the lever 35 is located which is attached to the axle 32 and connected to a piston rod in a hydraulic cylinder.

The hydraulic devices are in FIG. 1 designated by 36 and 37.

Said hydraulic devices effect the pivotal movement of the push-off arms, so that their free outer ends are pivotal from the starting position shown by full lines in FIG. 3 upward to the position shown by dash-dotted lines above the conveyor 1. The arms 15 and 17 thereby can be pivoted simultaneously while the push-off arms 16 and 18 are standing still, and vice versa.

The operation of the hydraulic devices preferably is controlled by electric systems, in such a manner, that at least to one axle 20, 32 for sumultaneously pivotal push-off arms preferably the movable part of a cam switch 38, 39, see FIG. 2, is connected.

The log turner preferably is also associated with an electronic device for detecting the centre of the log and with a top and root indicator device, for example according to the Swedish Pat. No 303,257. As, however, the design and function of these devices are known, only their operation is described in the following.

The described log turner according to the invention operates as follows when it is assumed to turn logs so, that for example their top end is directed forward in the conveying direction. A log arrives, for example, with its root end ahead to the charge conveyor 1, which advances the log over the opening 3 and further to the carrying chute 4. The top and root end indicator device indicates the top and root end positions of the log, i.e. that the root end is located ahead.

The log centre detecting device delivers an indication immediately prior to the arrival of the log centre straight above the opening 3 and the discharge conveyor 4. The hydraulic devices for the push-off arms 15 and 17 located on opposed sides of the log pivot these arms upward, and the arms while turning the log in clockwise direction push the same from the charge conveyor 1 and carrying chute 2 to the sheet metal decks 5 and 7, on which the log while continuously being pivoted in clockwise direction slides down onto the discharge conveyor 4, which conveys the log further at a speed slightly higher than that of the charge conveyor. When the log arrives at the charge conveyor 1 with its top end ahead, the push-off arms 16 and 18 become operative, and the log is pushed off to the sheet metal decks 6 and 8 for being passed to the discharge conveyor 4.

The arrangement according to the invention particularly shows the advantages that the push-off arms due to their arc-shape can transfer a substantial force for pushing off a log. Furthermore, at the same time as the pushing-off operation of a log from the charge conveyor and carrying chute has commenced, the next log can be advanced on the charge conveyor, because the push-off arms manage to return to substantially their starting position before the forward end of the lastmentioned log has come to the position for the arms. It is hereby gained that the logs can lie in a tight relationship end to end on the charge conveyor without colliding with the push-off arms. The logs do not risk, either, in spite of their tight feed to collide with each other on the discharge conveyor, because this conveyor runs at a higher speed, so that the logs lie in a less tight relationship thereon. The arrangement, consequently, has a high log conveying rate and turning capacity. The utilization of only one carrying chute instead of mechanically operated conveyors at conventional arrangements implies, besides, an advantageous simplification.

The invention must not be regarded restricted to the embodiment described and shown, because this can be modified within the scope of the invention, especially with respect to the design of its details. The carrying chute, for example, can be replaced by a roller plane or the like, and for pivoting the push-off arms mechanic means other than the described hydraulic devices can be provided.

We claim:

1. An improved log turner for aligning logs including a charge conveyor having a longitudinal axis for conveying a log over an opening, a discharge conveyor having a longitudinal axis extending substantially perpendicular to said charge conveyor axis and being disposed beneath said opening, and sheet metal decks inclining from said charge conveyor to said discharge conveyor, the improvement comprising:

carrying chute means aligned with said longitudinal axis of said charge conveyor on the opposite side of said opening, including sheet metal decks inclining from said carrying chute means to said discharge conveyor;

a first pair of arc-shaped push-off arms, each pivotally attached at one end below opposite sides of said charge conveyor, the second end of each arm pivotable above said charge conveyor and directed toward the opposite arm;

a second pair of arc-shaped push-off arms, each pivotally attached below opposite sides of said carrying chute means, the second end pivotable above said chute means and directed toward the opposite arm; and means for pivoting one opposite arm of each pair of push-off arms to pivot and discharge said log from said charge conveyor and said carrying chute means to said discharge conveyor.

2. An improved log turner as claimed in claim 1 wherein:

each one of each pair of push-off arms is mounted on an axle substantially parallel to said longitudinal axis, below said charge conveyor and said conveying chute means; and said pivoting means include hydraulic means coupled by levers mounted to each axle to pivot each of said push-off arms.

3. An improved log turner as claimed in claim 1 wherein:

said carrying chute means include a nondriven roller plane.

4. An improved log turner as claimed in claim 1 wherein:

said sheet metal decks are enclosed in a cylindrical vertical casing.

* * * * *